Aug. 8, 1933.   E. W. M. BAILEY   1,921,601
WINDOW GLASS GUIDE
Filed March 21, 1931   2 Sheets-Sheet 1

Inventor.
Edwin W. M. Bailey
by L. H. Hamman
atty.

Aug. 8, 1933.  E. W. M. BAILEY  1,921,601
WINDOW GLASS GUIDE
Filed March 21, 1931  2 Sheets-Sheet 2

Inventor.
Edwin W. M. Bailey
by [signature]
atty.

Patented Aug. 8, 1933

1,921,601

UNITED STATES PATENT OFFICE 1,921,601

WINDOW GLASS GUIDE

Edwin W. M. Bailey, Amesbury, Mass., assignor to Edwin M. Bailey, Amesbury, Mass.

Application March 21, 1931. Serial No. 524,256

14 Claims. (Cl. 296—44.5)

This invention relates to window glass guides, or channels which are primarily designed for use in connection with the doors of automobile bodies, for holding and guiding the window glass which is slidably mounted therein, and to means for securing such guides in position, particularly when the body construction is of sheet metal.

The window glass channels which are most generally employed are of two types, viz, flexible channels, or channels which consist of strips of rubber, usually covered with fabric, and metal channels which are usually lined with felt or other cushioning material. The flexible channels are usually secured in position by attaching them to the casing at their ends while held under tension, and, prior to my invention, the metal channels have usually been attached by bolts, screws, or rivets, which have been passed through the bottom of the channel into the casing.

As the longitudinal tension which is placed on the flexible channel is practically ineffective in preventing substantial lateral displacement of the portions intermediate the ends thereof, it is necessary to provide the door or casing with some form of retaining means for the channel, such as a groove into which the channel is set, to hold it in line with the sliding movement of the glass, but, as the sides of such grooves are unyielding, they form a positive limit to the thickness of the glass plate which may be placed in the channel. The legs or sides of such a channel also lack resilience and strength to such an extent that they only loosely hold glass which is of substantially less thickness than the glass of maximum thickness which may be placed therein. Flexible channels installed in this manner are also unprovided with means which are effective in preventing the middle portion thereof from swinging away from the bottom of the groove, or casing, a result which is objectionable under some conditions.

The metal channels are considered to be much preferable to the flexible channels, for various reasons, particularly on account of their finished appearance and the fact that they are much more effective in holding glass of varying thicknesses against vibration and danger of fracture from shock, but the method for securing them in position, referred to, is so slow and expensive that their use in automobiles of the lower price range is practically prohibitive. Also, the fact that the metal is usually very thin makes this method of attachment somewhat insecure.

The objects of my invention are to provide a metal window glass channel which will have all of the advantages of the metal channels now generally in use, but which is provided with means whereby it may be securely attached to a casing, and held against the possibility of lateral displacement, and may be installed more readily, and at less expense than the flexible channels now generally employed.

I accomplish these objects by providing the base of the channel, and the casing portion in which it is to be installed, with locking means which are adapted and arranged to be interengaged when the channel is moved lengthwise from the top end of the casing portion on which it is to be supported, so that the channel will be securely held in position by said means. Also by providing the base portion of a thin metal channel with a relatively rigid metal reinforcing strip, thereby to produce a metal channel having a rigid base portion, from which the channel securing means are formed, so that the channel may be securely installed, and flexible side portions, so that the glass will be yieldably engaged.

For a more complete disclosure of the invention, reference is now made to the following specification, in connection with the accompanying drawings, in which.

Figure 1:
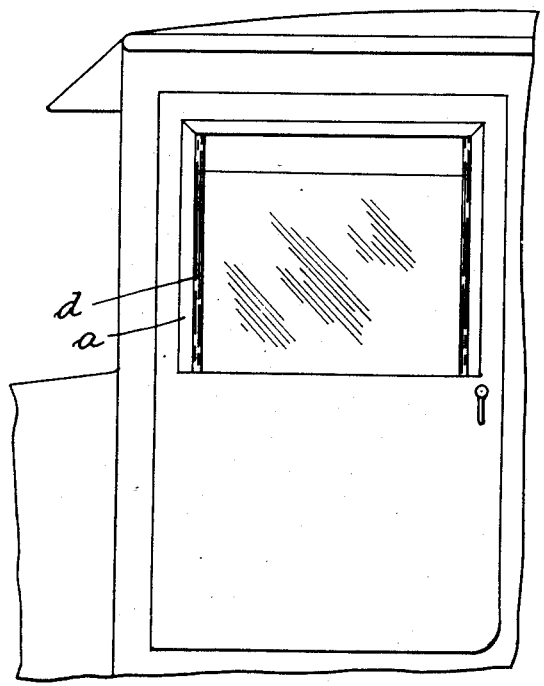
Fig. 1 is a side elevation of an automobile door, containing an embodiment of my invention.

As shown in the drawings, my invention may be embodied in various forms, and may be used in connection with a common form of door casing $a$, which may have a recess $b$, the bottom $c$ of which may form a seat for the base of the channel, or the seat may be formed on an unrecessed surface.

Figure 2:
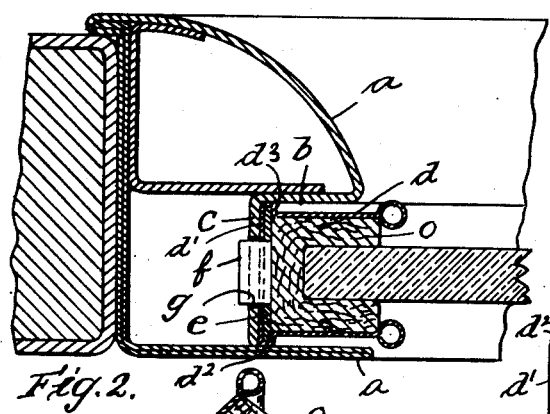
Fig. 2 is a cross-sectional view on an enlarged scale, of a channel and door casing embodying a preferred form of my invention.
Figures 5, 6:
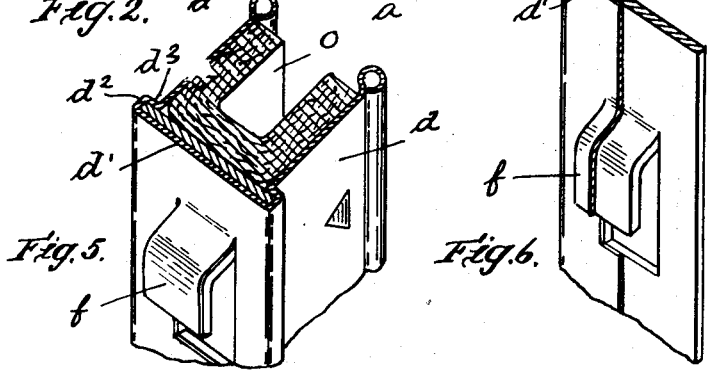
Fig. 5 is an enlarged detail, combined perspective and sectional view thereof.
Fig. 6 is a detail perspective view of a section of the metal channel and reinforcing plate which is employed.

According to the form of my invention shown in Figs. 1 to 6, I provide a U-form channel $d$, of thin and somewhat resilient metal, having its base reinforced with a flat strip of metal $e$, which is of substantially greater rigidity, strength and thickness than the sheet metal of which the channel is formed, said strip being incorporated in the channel during the usual bending operation which is performed in forming the channel from a flat strip of metal by placing the strip $e$ on the middle of the strip of channel metal and bending the latter up about each edge thereof, and then bending it inwardly and pressing it down onto the edge portion of the top side thereof, so that the strip $e$ is held between the base portion $d'$ of the channel, the side portions $d^2$, and the inwardly and downwardly pressed clamping portion $d^3$ thereof, as shown in Figs. 2 and 5. From this point the channel metal is bent outward, or away from the reinforcing strip at approximately right angles, to form the sides or legs of the channel, the edge portions of the sides being preferably rolled to form the usual edge bead. The reinforcing strip $e$ is thus securely incorporated in the channel, so that it practically forms an integral part thereof, although there is no actual integral connection between them.

After the channel, with the reinforcing strip incorporated thereon, has been formed, the base portion is punched to form a series of rectangular shaped tongues $f$, which project obliquely from the under side of the base towards what is to be the lower, or bottom end of the channel, and then extend in a direction parallel to the base, each channel being made as a right, or left for the particular window casing in which it is to be installed.

The seat $c$, or bottom of the casing groove in which the channel is to be mounted, is provided with a series of rectangular shaped apertures $g$, corresponding in location to, and adapted to receive the tongues $f$ of the channel, so that if the channel is passed downward in the casing groove from the top end of the door, before the top of the frame is secured in position, the tongues $f$ may be passed through the apertures $g$, and engaged with the bottom edge thereof. The channel will thus be supported by the tongues, and as the tongues fit closely in the apertures and are arranged to draw the base of the channel firmly against the casing, the channel will be securely held in position.

Figures 3, 4:
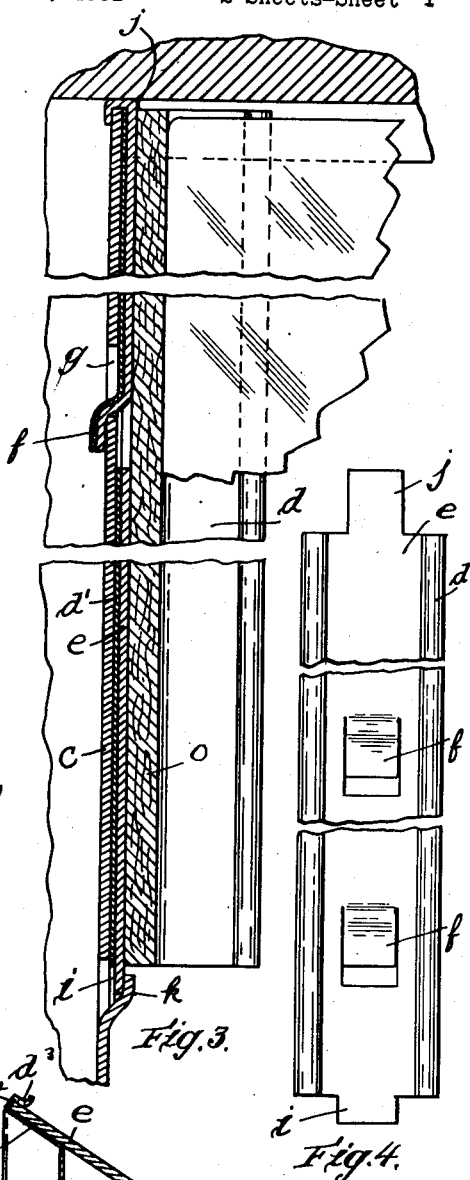
Fig. 3 is a longitudinal sectional view thereof.
Fig. 4 is a detail plan view of the channel shown in Figs. 2 and 3.

As shown in Figs. 3 and 4 the sides of the channel may be cut away, or the reinforcing strip may be extended beyond the sides at each end of the channel, to provide projecting portions $i$ and $j$ at its bottom and top ends respectively, and a tongue $k$ may be punched out from the casing, with which the bottom end portion $i$ may be engaged. The end portion $j$ may then be bent over the top edge of the casing in the form of a hook. This will be done before the top rail of the door is placed in position, and by this means the channel may be securely attached at its top and bottom ends, as well as at the intermediate portions, when employed in conjunction with the tongues $f$. It will be understood, however, that the tongues $f$ and end connections $i$ and $j$ may be employed either together or separately.

Figure 7:
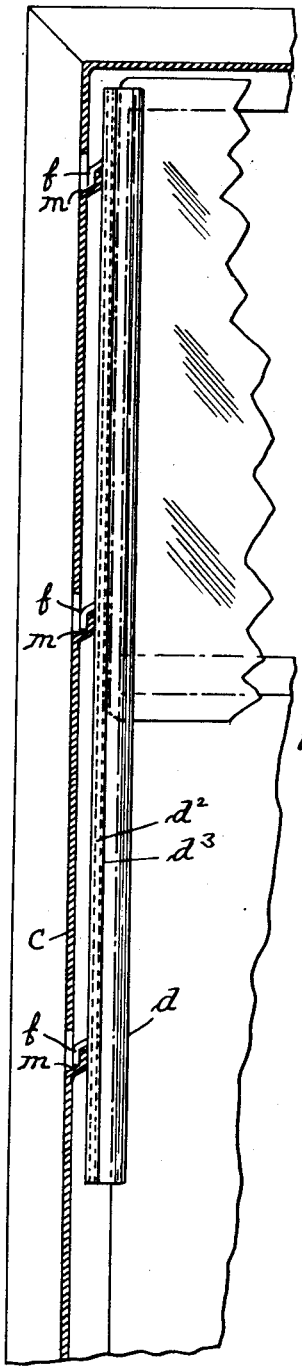
Fig. 7 is a longitudinal sectional view of a modified form of channel attaching means.
Figure 8:
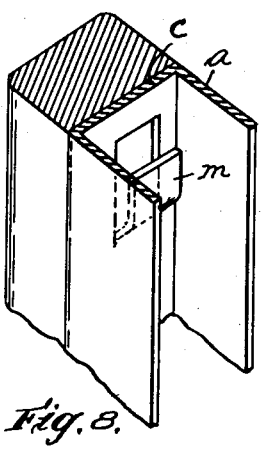
Fig. 8 is a detail perspective view of a section of the casing employed in this connection.

As shown in Fig. 7, a series of tongues $m$ may be punched out from the casing, so that they extend into its groove, and may be interlocked with a corresponding series of tongues formed from the channel base similar to the tongues $f$ already described. In this instance the base of the channel will not seat directly against the casing and the sides of the casing groove may be relied on to hold the channel against lateral movement. As a means for securing the channel in position this arrangement will be practically as effective as that previously described.

Figure 9:
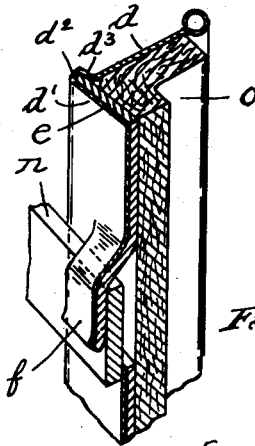
Fig. 9 is a combined sectional and perspective view of another modified form of attachment.

In lieu of forming tongues or apertures in the casing, a bar, as $n$, in Fig. 9, may be secured on the casing across the channel in position to engage the tongues $f$. In all instances, the channel $d$ will be lined with a felt cushion $o$.

While the tongues $f$ and end portions $i$ and $j$ may be formed from the base of the channel $d$, without employing the reinforcing strip $e$, if the channel was made of sufficiently heavy metal to give the tongues which are struck out therefrom the necessary strength and rigidity, it would be otherwise undesirable to make the entire channel of sufficiently heavy metal for this purpose, as its sides would be too stiff and unyielding, and its cost would be increased to an objectionable extent. Moreover, the rolling operation, by which the channel is formed, would be made more difficult by the necessary increase in the weight of the metal.

The manner of producing a channel having thin, yieldable metal sides and a connecting base of relatively thick rigid metal, already described, is one of several methods which may be employed.

Figure 10:
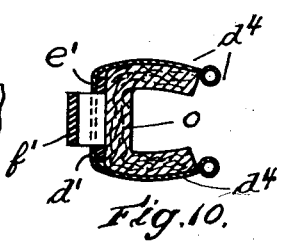
Figs. 10, 11 and 12 are sectional views of other modified forms of channel.

As shown in Fig. 10, a strip $e'$ of thick rigid metal may be secured on the base of a relatively thin metal channel $d^4$ by spot-welding, with satisfactory results.

Figure 11:
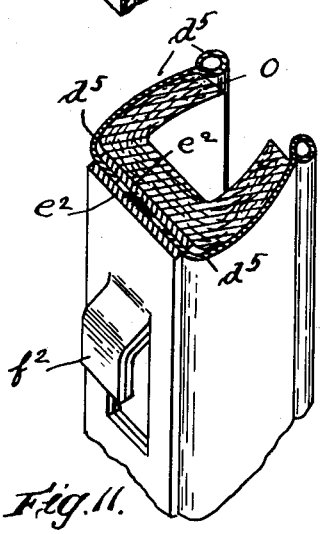

As shown in Fig. 11, the sides $d^5$ of the channel may be formed separately from thin metal strips, and the base edge portions of said sides may be clamped between two strips $e^2$ of relatively rigid metal, the latter being spot-welded together at their middle portions.

Figure 12:
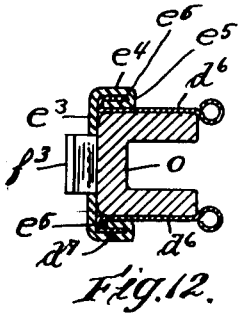

In Fig. 12, a form of channel, having the above described characteristics, is shown, which I consider preferable to those already described, as it may be produced at less expense than the others. In this form a base strip $e^3$ of relatively heavy stiff metal is provided having its edge portions bent outwardly, as at $e^4$, then towards each other, as at $e^5$, and then inwardly or reversely as at $e^6$. Thin, resilient metal sides $d^6$, which are formed from separate strips, are provided, and the inner edge portions $d^7$ thereof are bent reversely oppositely to the edge portions of the base $e^3$ and are interlocked therewith, the interlocked portions being firmly pressed together, so that said sides $d^6$ are rigidly and permanently connected to said base $e^3$. In the construction shown, the sides $d^6$ are in abutment with the base, so that all possibility of the connection becoming loosened will be avoided. However, other forms of interlocking connections between the base and sides may be employed, although the form shown is considered preferable of any of which I am aware.

In all of the above forms the edges of the sides will preferably be rolled to form a beaded edge, and one or more tongues, as $f'$ in Fig. 10, $f^2$ in Fig. 11, and $f^3$ in Fig. 12, will be cut, or punched out from the base for attaching the channel to the casing as before described.

With all of the above described constructions, the channel may be placed in position much more quickly than is posible by the methods previously employed, so that a runway for the glass will be provided which will have at least all of the advantages of previously employed metal channels, and which may be installed at even less expense than the cost of installation of the flexible channels.

Also the cost of installing the metal channels will be greatly reduced, as compared with previous practice, while the security with which the channel is held in place is substantially increased.

I claim:

1. A window casing having a vertically disposed window glass guideway comprising a U-form channel of thin metal for receiving an edge portion of the glass, a reinforcing strip of relatively thick metal disposed within the channel on the base thereof and attached thereto and oppositely disposed engaging means on said casing and on said strip arranged for interengagement when the channel is moved longitudinally downward into its guiding position on the casing.

2. A window glass guideway including a channel member having the base and side portions thereof formed of thin yieldable metal, and having a reinforcing strip of relatively thick rigid metal secured on the top side of its base portion between its side portions, said strip having a tongue formed therewith and projecting therefrom through the base portion of the channel in position for interlocking engagement with the window casing.

3. A window glass guideway including a channel member having its base and side portions formed of yieldable metal, the base portion thereof having a strip of relatively rigid metal of uniform width and thickness disposed on its top side and having its side portions bent about the edges of the strip and clamped against the top side thereof and extended outwardly therefrom and means on said strip arranged to extend through the base of the channel and to be engaged with the window casing to secure the channel in guiding position.

4. A window glass guideway comprising a channel having its sides and connecting base portion of thin, yieldable metal and a strip of relatively thick rigid metal extending over and secured to said base portion and a tongue formed from said strip and base portion and projecting from the bottom side thereof to engage the support on which the channel is mounted.

5. A casing having a window glass guideway mounted thereon and comprising a channel having its base and sides of thin yieldable metal and having a relatively rigid reinforcing strip extending coextensively with the channel base and secured thereto, said base and reinforcing strip having a tongue cut therefrom in coincident relation and extended into engagement with said casing, to hold the channel in guiding position on the casing.

6. A window glass guideway including a channel member having the base and side portions thereof formed of thin yieldable metal, and having a reinforcing strip of relatively thick rigid metal secured on the top side of its base portion between its side portions, one of the end portions of said strip being extended beyond the side portions of the channel and arranged for engagement with a casing to attach the same thereto.

7. A window casing having a window glass guideway comprising a U-form channel of thin metal, a reinforcing metal strip secured on the base of said channel and extending approximately throughout the length and width thereof and means on said reinforcing strip and on the casing arranged for inter-engagement when the channel is moved longitudinally into its guiding position on the casing.

8. A window casing having a window glass guideway comprising a U-form channel of thin metal, a reinforcing metal strip secured on the base of said channel and tongues formed from said strip and projecting from the bottom side thereof and means on the casing arranged for inter-engagement by said tongues, to hold the channel in guiding position thereon.

9. A window casing having a window glass guideway comprising a U-form channel of thin metal, a reinforcing metal strip secured on the base of said channel, tongues formed on said strip and base in coincident relation and means on the casing arranged for inter-engagement with said tongues to hold the channel in position on the casing.

10. A window glass guideway comprising a U-form channel of thin metal, a reinforcing strip of metal secured on the base of said channel and extending for the length thereof, and means extending from said reinforcing strip and arranged for inter-engagement with complemental means on the casing for holding the channel in position thereon.

11. A window glass guideway comprising a U-form channel of thin metal, a reinforcing strip of metal secured on the base of said channel and extending for the length thereof, and tongues formed from said strip and extending beyond the bottom side of the channel base in position for inter-engagement with complemental engaging means on the casing.

12. A window glass guideway comprising a U-form channel of thin metal, a reinforcing strip of metal secured on the inner side of the base of said channel and extending throughout approximately the length and width thereof, and a tongue formed from said strip and extended through said base in position for interlocking engagement with complemental means on the casing.

13. A window glass guideway comprising a U-form channel of thin metal, a reinforcing strip of metal secured on the inner side of the base of said channel and extending throughout approximately the length and width thereof, said base and said strip having tongues cut therefrom in coincident relation for interlocking engagement with complemental means on the casing.

14. A window glass guideway including a U-form channel of thin metal, a reinforcing strip of uniform width and thickness disposed within said channel on the base thereof, the side portions of the channel being bent about the edges of the strip and clamped against the top side thereof and means on the strip arranged for interlocking engagement with coacting means on the window casing, to hold the channel in position thereon.

EDWIN W. M. BAILEY.